3,228,820
NONFOAMING PROCESS FOR BONDING FOAM
TO POROUS SUBSTRATES
Richard D. Samson, 53 Sugar Maple Lane,
Levittown, Pa.
No Drawing. Filed May 14, 1962, Ser. No. 194,661
10 Claims. (Cl. 156—307)

This invention relates to a novel nonfoaming process for the bonding together of extant foam and substrates to produce novel bonded structures. In particular, this invention relates to a novel process for the bonding together of extant or preexisting foam to a layer of a woven or non-woven fiber such as paper, woven fabrics, non-woven fabrics or another layer of foam to produce novel bonded structures.

Laminates of foam and substrates of woven fabrics have found utility in the manufacture of lightweight composite fabrics which possess unusual and desirable heat insulating properties and which prove to be desirable attributes in such articles as drapes, blankets, outer garments such as cold weather coats and jackets, and in other articles such as inner linings for shoes and boots. Laminates of foam and substrates of paper are of commercial interest in providing superior permeable filter media, and also as nonfriable foamed structures which may be used as breathable heat insulating media. Permeable structures comprised of several laminated layers of foam are also of commercial interest as select filtering media.

Attempts have been made by those in the art to combine various substrates with foam by lamination or interfacial bonding methods using many commercially available adhesive compositions and/or by flame melting techniques but until this time these methods have not produced completely satisfactory products. In some cases, the laminated structures produced have either shown buckling defects or puckering defects, that is to say an undesirable bunching of the substrate in time, or a delamination occurs in time over small areas of the interfacial surface. In other cases an undesirable changing of the qualities of the drape and hand of composite fabric structures thereby produced occurs in comparison to what would be expected from that of a simple laminated combination of the woven and foam components, such as by undue stiffening. In still other cases the laminates have become delaminated with washing or wetting of the laminated structures and/or with dry cleaning.

One object of the present invention is to provide novel bonded structures of foam with woven and non-woven fabrics, paper or foam. Another object of this invention is to provide a novel process for fabricating the aforestated novel bonded structures. Still another object of this invention is to provide novel bonded structures of foam and woven fabrics which are particularly resistant to delamination that may otherwise occur in conventional washing and dry cleaning processes. Yet another object of this invention is to provide novel bonded structures of foam and of woven fabrics or of paper that are unusually resistant to localized delaminations as evidenced by a buckled, pocked, puckered, distended or blistered appearance of the outer surface of the substrate side of such prior art bonded structures. A further object of this invention is to provide novel bonded structures of foam and woven fabrics which possess such qualities of drape and handle that are pleasing and that may be prescribed merely by a knowledge of the qualities of drape and handle possessed by the individual component foam and woven fabrics employed therein.

The bonded structures of the present invention consist of foam bonded to foam, woven fabric, unwoven fabric, paper or like substrates through means of an adhesive interlayer, this bonding interlayer being a cured polyurethane composition.

It has been unexpectedly found that the objects of the present invention can be realized if:

(a) There is applied to the "wrong" side surface, i.e. contact interfacial surface, of the foam and/or the substrate being bonded thereto a liquid bonding composition comprising one or more imine, oxime or ketoxime blocked urethane prepolymer having a molecular weight of about 400 to 6000 and preferably 2000 to 3000 and an —NCO/blocking agent ratio, i.e. ratio of equivalents by weight of isocyanate of the prepolymer to equivalents by weight of active hydrogen of the blocking agent, of about 1 to 2 and preferably about 1.5 to 1.8 and sufficient quantities of at least one crosslinking or cure agent to provide a ratio of total —NCO/active hydrogen, i.e. ratio of equivalents by weight of isocyanate of the prepolymer to equivalents by weight of active hydrogen of the curing agent, of about 0.5 to 2.0 and preferably about 1.0;

(b) The wrong side surfaces of the foam and substrate are then nipped or pressed together under pressures of up to about five pounds per square inch to produce an interpenetration of both layers by the liquid bonding system and a temporary face to face adherence of the wrong side surfaces to each other; and, (c) The nipped face to face adhering layers are then subjected to a heat treatment of about 175 to 400° F. and preferably for relatively short periods of time, i.e., about 0.5 to 120 minutes, to unblock and heat cure the urethane prepolymer and thus permanently bond the layers together.

The face to face adherence of the paired wrong side surfaces noted above is temporary in that it is not intended to be and is not in fact a permanent bond and lasts only until the curing agent and curing temperatures actually effects the permanent bond. The temporary adherence is brought about by the combined liquid and unusually tacky nature of the bonding composition and the nipping or pressing together of the foam and substrate layers, which, because of their natural compressible natures can be pressed together under these conditions to form a temporarily bonded structure which will resist delamination though subject to moderately rough handling during the remainder of the process prior to formation of the permanently bonded laminate. The process of the present invention can be run under a batch or continuous operating conditions.

The utility of the novel bonding compositions of the present invention in the fabrication of foam to fibrous material laminates is greatly enhanced by the tacky nature of these compositions. The tackiness of these compositions can be regulated, moreover, to provide compositions having lesser or greater degrees of tackiness as the foam and/or substrate layers being used require. The compositions become tacky as the cure of the prepolymer progresses to the gel point. They have the highest degree of tackiness just prior to the gel point and are not very tacky after the gel point and get even less tacky as the cure reaction continues past the gel point. It is thus possible, for example, to prepare and use according to the present invention partially blocked and partially cured prepolymers so as to have available compositions of varying degrees of tackiness for use with various combinations of foam and substrate layers.

By a "wrong" side surface it is meant, according to the present invention, the interfacial surfaces of the foam and substrate components which are not to be the outside facing surfaces of the resulting laminated product. They are the inside surfaces of the foam and substrates to which the adhesive composition is applied and across which the curing reaction occurs to bond the several layers together. It is within the concept of the present invention to bond one or more layers of foam to one or more substrate layers. In such cases the inner layer(s) of the laminated structure will have two wrong or inside surfaces. Where one or more layers of foam are to be bonded to one or more substrate layers each pair of wrong side surfaces to be bonded together may be processed successively or concurrently. About 0.5 to 4 ounces by weight of the bonding composition are needed for about every square yard of laminated area according to the present invention. The bonding compositions should have a solids content of about 35 to 80% and preferably about 50 to 70%.

The urethane prepolymers which may be used in the bonding compositions in the present process may have in general either an ester and/or an ether backbone. The ester type materials however, are preferred. The most preferable of these ester materials are the esters prepared from ethylene glycol/propylene glycol/adipic acid mixtures. Castor oil may also be used. The useful prepolymers are formed by so reacting the ester and/or ether materials with one or more organic diisocyanate group containing materials such as tolylene diisocyanate, diphenyl methane diisocyanate, 1,5-naphthalene diisocyanate and hexamethylene diisocyanate that the resulting product has an —NCO content of about 2.5 to at most about 10% and preferably about 3% by weight.

In forming the blocked prepolymers, the prepolymers may be blocked with one or more imine, oxime or ketoxime blocking agents such as ethylene imine, propylene imine, acetophenone oxime, butyraldoxime, methyl ethyl ketoxime, cyclohexanone oxime and methyl ethyl ketoxime. The ketoxime blocked prepolymers are preferable because they generally have better cure temperature properties and can be stored for rather indefinite periods of time prior to use. The most preferable blocking agent is methyl ethyl ketoxime. In blocking the prepolymers, the prepolymer and blocking agent are reacted in the ratio of equivalents by weight of active —NCO units to imine, oxime or ketoxime blocking agent units, i.e. ratio of gram equivalent weights of prepolymer in terms of isocyanate functionality or as stated as above equivalents of isocyanate of the propolymer, to gram equivalent weights of blocking agent in terms of active hydrogen functionality, or stated as above equivalents of active hydrogen of the blocking agent, of about 1.0 to 2.0.

It is preferable to react the prepolymers and the blocking agents in nonaqueous organic solution. The solvent system chosen should be capable of dissolving not only the prepolymer and the blocking agent, but preferably the cure agents as well, used in the bonding compositions, and further should be of such volatility that it may be readily and completely volatilized during the period of cure at the elevated cure temperatures employed and yet further be of such nature so as not to impair the properties of either the foam or substrate components. Among the more useful solvents which may be used in the process of the present invention there are aromatic solvents such as benzene, toluene and xylene, esters such as butyl acetate, Cellosolve acetate and ethyl acetate, chlorinated hydrocarbon solvents such as methylene chloride, trichloroethylene and perchloroethylene, and aliphatic ketone solvents such as acetone and methyl ethyl ketone, or compatible combinations thereof. The use of alcohols, amines and water, as solvents, are preferably avoided in the practice of this invention because of the tendency of these solvents to interfere with the necessary blocking and cure reactions. This latter group of solvents may be used under such conditions where they do not interfere with the blocking or curing reactions as where they are used with the prepolymer after it is blocked and removed therefrom before it is cured. The solvents may be used singly or in combination, the choice by the practitioner of a specific solvent system being usually dependent upon factors such as the solubility values of the specific solutes therein, the time and temperatures required by a specific embodiment of the invention for complete removal of solvent by volatilization, and also the solubility and chemical resistance of the foam and substrate components in the specific solvent systems.

The nonfoam forming process of the present invention prescribes an unblocking of blocked diisocyanate terminated prepolymers at elevated temperatures of about 175° to 400° F., followed by crosslinking of the thus activated isocyanate terminals with nonfoam forming organic cure agents at these same temperatures to provide therewith the bonding action needed to bond the several layers of foam and substrates together. The curing time, as noted above, may vary from 0.5 to 120 minutes depending on the curing temperatures employed, the higher temperatures requiring the shorter times. The temperature and curing times employed should be such as to allow for the substantial removal of the solvent before the actual curing procedure so that the presence of substantial amounts of solvent do not interfere with the curing reaction. Cure agents which are effective in the process of the present invention include N,N,N',N'-tetrakis(2-hydroxypropyl)ethylene diamine, triisopropanolamine, triethanolamine, diethanolamine, diisopropanolamine, phenyl diethanolamine, dichlorobenzidine and N-methyl diethanolamine. N,N,N',N' - tetrakis(2 - hydroxypropyl)-ethylene diamine is the preferred cure agent because of its overall cure properties. The cure agents are usually dissolved in the bonding solutions containing the blocked prepolymer prior to use, and may be added to such compositions and stored with them for substantial periods of time prior to use and yet produce no deleterious results. The cure agents are added to the blocked prepolymer systems in such quantities as noted above as to provide for ratios in equivalents of total isocyanate, both blocked and free, to that of reactive hydrogen values which are furnished by the cure agents i.e. ratio of gram equivalent weights of prepolymer in terms of isocyanate functionality or as stated above equivalents of isocyanate of the prepolymer, to gram equivalent weights of cure agent in terms of active hydrogen functionality or as also stated above equivalents of active hydrogen of the cure agent, in the form of OH or $NH_2$ groups, of about 0.5 to 2.0 and preferably about 1.0.

Cure accelerators may also be used in the bonding compositions of the present invention where it may be desired to hasten the rate of cure and/or to reduce the temperature required to effect the cure. Cure accelerators which may be used in this regard include stannous octoate, lead octoate, 2,2,1-diazobicyclooctane, tetramethylbutane diamine, dibutyl tin di-2-ethylhexoate, metallic naphthenates and metallic acetylacetonates. Up to about 5 parts by weight of the accelerators may be used per 100 parts by weight of blocked prepolymer. The cure accelerators however are preferably added to the bonding compositions shortly before the latter's use in the laminating process to avoid the storage of the accelerators with the blocked polymer/cure agent systems for prolonged periods of time.

Thickening agents are also of use in certain embodiments of this invention, in that by their inclusion, in some instances, in the bonding compositions they help to prevent an undesirable "strike through" or complete penetration by the wet bonding composition to the outer surface of the foam and/or substrate components of the proposed laminate. Where used, such thickening agents are usually inert filler type materials such as the powdered silicon dioxides and may be present in the bonding compositions in amounts of about up to 50 parts by weight per 100 parts by weight of blocked prepolymer. "Strike through" may also be prevented by increasing the viscosity of the bonding composition by only partially blocking the active —NCO terminals of the prepolymer and then preparing a partially cured prepolymer from the partially blocked prepolymer for use in these compositions. The partially cured prepolymers are more viscous than the totally blocked prepolymers.

It has now been unexpectedly found that where the bonding process of the present invention is used that the resulting novel composite products of bonded foam and woven materials are most unusual, not only in that they possess qualities of "handle" and "drape" that are most pleasing aesthetically, but also that the handle and drape of the laminate appear to be a simple composite of the individual qualities of hand and drape of the woven fabric and foam components used therein; these qualities not being substantially affected, modified or impaired through the use of a bonding interlayer. It has also been unexpectedly found that the bonded fabric structures produced by the process of the present invention are unusually resistant to the type of delamination which is common to prior art fabric laminates upon repeated washing and/or dry cleaning operations. Further, it has also been unexpectedly found that these bonded fabric structures are unusually resistant to localized delamination which is common to prior art fabric laminates and which results in an unsighlty, pocked, puckered, distended and/or blistered appearance on the woven fabric surface of the laminate.

Woven fabrics which may be employed as substrates in the process and structures of the present invention include natural fiber weaves from silk, cotton, linen, wool filaments, and synthetic fiber weaves from cellulose acetate, cellulose triacetate, regenerated cellulose (rayon), spun glass, polyamides, polyesters, polyacrylates, polyethers, polyurethanes (including "Spandex" fibers), polyolefins, polyvinylidene chloride, polyvinyl chloride and other filaments, and/or weaves from compatible blends of any of the foregoing.

In general the foam and woven fabric raw materials to be used in the process of the present invention are selected so as to produce specific laminated fabric end products by taking into consideration only the properties of the individual foam and woven fabrics and how these properties would modify one another by combination into a composite fabric. The bonding interlayer therefore need not be considered in the use of the present invention as an important modifying influence on the properties of the composite fabrics being used as it would otherwise be in the use of prior art methods. The novel capabilities and conveniences thus provided in the design of novel composite foam and woven laminated fabrics by the present invention, therefore, impart substantial advances to the laminated foam/fabric arts.

With respect to the novel laminates of foam and paper capable of being produced by the process of the present invention, it has been unexpectedly found not only that excellent bonding is effected and that a novel product is provided that is essentially free of interfacial delaminations, but also that the novel structures produced thereby are far more easily handled than is the foam alone. The lamination process of the present invention produces structures have an essentially nonfriable paper surface that protects the otherwise friable surface of the foam in both shipment, storage and end use. Further, it has been unexpectedly found that where foam is desired for use as a filtering medium for fluids, that now utility is provided by the structures produced by the present invention by substantially prolonging the life of the filter over that of just foam alone, the surfaces of the laminates of foam and paper being better protected against the erosive effects of the passage of fluids therethrough.

The types of paper which may be employed as one or more of the substrates in the process and structures of the present invention, include porous filter papers, kraft-type construction papers, such as corrugated paper board, multi-walled papers, and others.

Laminates of foam on foam made according to the present invention may be composed of various layers of foam, each layer of which may have either the same or different porosity values or cell size. It has been unexpectedly found that not only is excellent bonding effected according to the present invention between interfacial foam surfaces but that the bonded interfaces may be open to the facile passage of fluids therethrough and thus providing for new foam applications by now making it possible to prescribe, design and obtain foam filtering media for specific needs by merely combining at will laminated foams of different filtering properties and flow path properties. In like manner different foams may now be laminated together to provide structures with any prescribed composite physical properties, such as compressive strength, etc.

The foams which may be employed in the process and structures of the present invention include both open and/or closed cell structured foams of a polyvinylchloride, polyvinylidene chloride, polyurethane, polyurea, polyepoxide, cellulosic-type, or other polymeric chemical backbones such as that found in natural sponges. The foams used in the laminates would be chosen for use by reason of design requirements, such as in physical requirements of specific porosity, rigidity, density, compressive strength, electrical and heat insulation properties, etc., and by reason of the chemical properties demanded of the laminated systems, such as solvent, acid or alkali resistance, etc. The present invention especially contemplates the lamination of urethane foam on urethane foam, and the resultant structures provided.

The bonding compositions may be prepared by (a) dissolving the desired preploymer in a select solvent system: (b) adding the desired blocking agent to the liquid mixture to form the dissolved blocked prepolymer, and then, (c) dissolving and/or dispersing the desired cure agents and cure accelerators and/or thickening agents in the blocked prepolymer system. In this process the following cautions obtain: the components of the system should be compatible and not cause premature reactions with the curing agent and/or the —NCO groups; the compositions should be formed and stored at temperatures of less than about 125° F.; where prolonged periods of storage of the bonding compositions are desired, the bonding compositions should be prepared without cure accelerators, and, however, where cure accelerators are deemed necessary to the pursuit of specific embodiment of the bonding process the cure accelerators should be added to the bonding compositions within a short interval prior to use.

The following examples are merely illustrative of the present invention and are not intended as a limitation upon the scope thereof.

*Example 1*

A liquid bonding composition was formed by (A) dissolving 100 parts by weight (p.b.w.) of a urethane prepolymer having an —NCO content of about 3% and containing an 80/20 ratio of repeating units of ethylene glycol adipate/propylene glycol adipate in the molecular backbone thereof and having an average molecular weight of about 3,000, in 66.3 p.b.w. of the solvent methylene chloride, and, (B) by adding 5.7 p.b.w. of methyl ethyl ketoxime to form a ratio in equivalents of isocyanate/ketoxime blocking units of about 2 to form a half-blocked prepolymer, and (C) adding 4.8 p.b.w. of N,N,N′,N′-tetrakis(2-hydroxypropyl)ethylene diamine to form a ratio in equivalents of total isocyanate (both free and hindered)/active hydrogen curing units of about 1.15. The resulting solution had a solids content of about 80%, to this there was then added, with mixing, 5% by weight of Cab-o-Sil, a powdered silicon dioxide thickening agent.

This bonding composition was then applied to a 12″ square of woolen jersey fabric. The jersey and a 12″ square of a polyurethane polyester foam were nipped together under pressure, and then heated to and maintained at 250° F. for 7 minutes. An excellent bond was effected which showed no delamination upon dry cleaning.

*Example 2*

A bonding composition was prepared corresponding to that described in steps A, B and C of Example 1. To this was added enough methylene chloride to produce a sprayable composition having 50% solids content. Lead octoate was then added to the extent of 1% by weight of the solids present.

Several swatches of jersey were sprayed with the bonding composition and nipped under pressure with a polyurethane foam sold by Pellon Corp. under the trade designation "Pellon®" foam. The composite structure was then heated and maintained at 250° F. for 7 minutes, and produced a well bonded laminate which showed no delamination after dry cleaning.

*Example 3*

A bonding composition prepared as in Example 2 and having a solids content of 35% and containing 1% lead octoate, was sprayed onto swatches of poplin, nylon cloth (Helenca) and burlap. The cloth swatches were then nipped under pressure with a polyurethane foam designated as "Cone foam" by the Olympic Chemical Company. The uncured laminates were then subjected to 250° F. for 7 minutes, to produce excellently bonded structures. The laminates, upon examination showed no interfacial delamination and the hand and drape of the bonded structures were very similar if not identical to the composite hand and drape of the component foam and fabrics.

*Example 4*

Heavy nylon tricot fabric was sprayed with a bonding composition prepared as in Example 1 but containing 50% solids, 1% lead octoate and 3% Cab-o-Sil silicon dioxide. The fabric was nipped under pressure with a sheet of Scott polyester polyurethane foam and then heat treated for 7 minutes at 250° F. An excellent fabric laminate was produced that showed no evidence of strike through.

*Example 5*

A slab of Scott polyester polyurethane foam of pore size 60 was sprayed with the bonding composition of Example 2 which had a 50% solids content and contained 1% lead octoate. The wetted foam was then nipped under pressure with a similar but lower density polyester polyurethane foam of pore size 10; the composite structure was then heat treated at 400° F. for 30 seconds to yield an excellent select filtering laminated structure.

*Example 6*

A sheet of polyester polyurethane foam was sprayed with the bonding composition of Example 4, and then nipped under pressure with a sheet of filter paper, such as is used in laboratories. The system was then subjected to 250° F. for 7 minutes to produce an excellent porous laminate showing no delaminations or strike through.

The non-woven fibrous materials which may be employed in the process and structures of the present invention include non-woven materials made from any of the natural and synthetic fibers mentioned above using any of the usual felting, thermal and chemical bonding techniques known to the art. Materials of these types are described in "Non-woven Fabrics—An Unbiased Appraisal," by Coleman M. Brandt et al., and published by Non-woven Associates in 1959 (Library of Congress No. 59-13229).

I claim:

1. A nonfoaming process interruptable at any point therein and subsequently continuable to provide laminates of a plurality of layers of foam and porous substrates with cured nonfoamed urethane interlayers therebetween comprising (a) applying from about 0.5 to 4 ounces by weight of a liquid adhesive composition so as to wet at least one of each two contact interfacial surfaces of at least one layer of extant foam and at least one porous substrate layer per square yard of contact interfacial surface, said adhesive composition comprising a nonaqueous organic solution of a urethane prepolymer blocked with a blocking agent selected from the group consisting of imines, oximes and ketoximes, said blocked prepolymer having a molecular weight of about 400 to 6000 and a ratio of equivalents of isocyanate by weight of said prepolymer to equivalents by weight of active hydrogen of said blocking agent in the range of about 1 to 2 and sufficient quantities of at least one organic curing agent to provide a ratio of equivalents by weight of isocyanate of said prepolymer to equivalents by weight of active hydrogen of said curing agent in the range about 0.5 to 2.0;

(b) joining said layers of extant foam and porous substrate under pressure such that their contact interfacial surfaces are mutually wetted by said adhesive composition and such that an adherence is thereby effected between each two layers of extant foam and porous substrate so joined by said liquid adhesive composition interlayer therebetween; and (c) heating the thus joined and adhering plurality of layers of extant foam and porous substrate and liquid adhesive interlayers therebetween so as to volatilize said solution's solvent, unblock and disassociate said prepolymer and said blocking agent, volatilize said blocking agent, interact said prepolymer and said curing agent so as to cure said prepolymer to a solid interlayer and thus permanently bond therewith said plurality of extant foam to porous substrate layers.

2. A nonfoaming process comprising:

(a) applying about 0.5 to 4 ounces by weight of a liquid adhesive composition per square yard to at least one contact interfacial surface of a plurality of layers of a proposed foam to porous substrate laminate, said adhesive composition comprising a nonaqueous solution of a urethane prepolymer blocked with a blocking agent selected from the group consisting of imines, oximes and ketoximes, said blocked prepolymer having a molecular weight of about 400 to 6000 and a ratio of equivalents by weight of isocyanate of said prepolymer to equivalents by weight of active hydrogen of said blocking agent in the range of about 1 to 2 and sufficient quantities of at least one nonfoam forming organic cure agent to provide a ratio of equivalents of isocyanate of said prepolymer to equivalents of active hydrogen of said cure agent in the range of about 0.5 to 2.0;

(b) nipping said layers together so as to produce an interpenetration of said layers by said adhesive composition through the contact interfacial surfaces thereof and occasion a temporary face to face adherence of paired contact interfacial surfaces, and (c) heating the temporarily adhering layers to at least substantially remove the solvent therefrom, unblock the prepolymer and cure the unblocked prepolymer with the curing agent so as to effect a permanently bonded laminate.

3. A process as in claim 1 in which said curing is conducted at about 175° to 400° F.

4. A process as in claim 1 in which said substrate is a layer of paper.

5. A process as in claim 1 in which said substrate is a layer of woven fabric.

6. A process as in claim 1 in which said substrate is a layer of nonwoven fabric.

7. A process as in claim 1 in which said substrate is a layer of foam.

8. A process as in claim 2 in which said adhesive composition further comprises up to about 5 parts by weight of at least one cure accelerator per 100 parts by weight of the blocked prepolymer.

9. A process as in claim 2 in which said adhesive composition further comprises up to about 50 parts by weight of at least one filler per 100 parts by weight of blocked prepolymer.

10. A process as in claim 2 in which said blocking agent is methyl ethyl ketoxime.

References Cited by the Examiner

UNITED STATES PATENTS

| | | |
|---|---|---|
| 2,360,192 | 10/1944 | Bestian et al. |
| 2,723,935 | 11/1955 | Rodman. |
| 2,826,526 | 5/1958 | Meyrick et al. |
| 2,972,554 | 2/1961 | Muskat et al. |
| 2,993,813 | 7/1961 | Tischbein _____ 260—77.5 |
| 2,993,869 | 7/1961 | Gmitler et al. _____ 260—77.5 |
| 3,007,831 | 11/1961 | Keenan _____ 156—331 |
| 3,050,432 | 8/1962 | Weinbrenner et al. |

FOREIGN PATENTS

| | | |
|---|---|---|
| 118,839 | 8/1944 | Australia. |
| 167,675 | 7/1952 | Australia. |
| 543,986 | 7/1957 | Canada. |
| 558,645 | 6/1958 | Canada. |
| 789,302 | 1/1958 | Great Britain. |
| 808,421 | 2/1959 | Great Britain. |
| 887,023 | 1/1962 | Great Britain. |

OTHER REFERENCES

Dombrow, B. A.: Polyurethanes, N.Y. Reinhold, 1957, pp. 26, 27.

EARL M. BERGERT, *Primary Examiner.*